United States Patent [19]

Ogiya et al.

[11] Patent Number: 5,642,219

[45] Date of Patent: Jun. 24, 1997

[54] OPTICAL REPEATER

[75] Inventors: Shuji Ogiya; Kensuke Shinohara; Taiichi Takeda, all of Kawasaki, Japan

[73] Assignee: Fujitsu Limited, Kanagawa, Japan

[21] Appl. No.: 600,768

[22] Filed: Feb. 13, 1996

[30] Foreign Application Priority Data

Jul. 27, 1995 [JP] Japan .................................. 7-191975

[51] Int. Cl.$^6$ .................................. H01S 3/00; G02B 6/36
[52] U.S. Cl. .............................. 359/341; 385/92; 385/135
[58] Field of Search .......................... 359/341; 385/135, 385/88, 89, 92

[56] References Cited

U.S. PATENT DOCUMENTS

| | | | |
|---|---|---|---|
| 5,383,051 | 1/1995 | Delrosso et al. | 359/341 |
| 5,515,200 | 5/1996 | Delrosso et al. | 359/341 |

FOREIGN PATENT DOCUMENTS 07336309  12/1995  Japan .

Primary Examiner—Mark Hellner
Attorney, Agent, or Firm—Helfgott & Karas, P.C.

[57] ABSTRACT

An optical repeater having a first optical fiber extending from an input optical fiber cable, a light amplifying medium connected to the first optical fiber, a pumping light source for outputting pumping light, an optical coupling module for introducing the pumping light into the light amplifying medium, a drive circuit for driving the pumping light source, a power circuit for supplying electric power to the drive circuit, and a second optical fiber for sending signal light amplified. The optical repeater has a general-purpose common frame. The common frame has an inner space defined so as to accommodate the pumping light source and the optical coupling module, and has a bobbin portion for winding at least one of the first optical fiber and the second optical fiber. The drive circuit and the power circuit sometimes differing according to the kinds of products are mounted on an individual frame detachably fixed to the common frame. The optical repeater is suitable for a reduction in size, has good heat radiation, and is suitable for flexible manufacturing.

8 Claims, 9 Drawing Sheets

OPTICAL REPEATER

BACKGROUND OF THE INVENTION

1. Field of the Invention

The present invention relates generally to an optical repeater applicable to a direct optical amplification submarine interconnection system, and more particularly to an inner unit structure in an optical repeater provided with a light amplifying medium such as an erbium doped fiber.

2. Description of the Related Art

An optical submarine interconnection system as a typical system provided with an optical repeater is one for transmitting an optical signal via a submarine cable including an optical fiber laid along a sea floor between continents or the like and for relaying the attenuated optical signal with an optical repeater set on the sea floor to thereby compensate for the attenuation or the like. In recent years, an optical repeater provided with an optical amplifier has reached a level of practical application, and the optimization of an inner unit structure in the optical repeater is being groped for.

Conventionally, a 3R type regenerative repeater is known as an optical repeater to be applied to a system including an optical fiber cable and a power cable for series constant current feed laid between a first terminal station and a second terminal station. In this optical repeater, an optical signal from an input optical fiber cable is once converted into an electrical signal by a photodetector. After the electrical signal is subjected to given processing such as waveform shaping, the electrical signal is converted again into an optical signal, which is in turn sent to an output optical fiber cable.

Further, an optical amplifier provided with a doped fiber doped with a rare earth element such as Er (erbium) as a light amplifying medium has reached a level of practical application in recent years, and an optical repeater (optical amplifying repeater) having this kind of optical amplifier is being developed.

The optical amplifying repeater has a feature, in a word, such that it has an electrical circuit greatly simplified and an optical circuit greatly complicated in comparison with the 3R-repeater. Accordingly, the optical amplifying repeater has various technical problems to be solved. The problems will now be described more specifically.

(1) The 3R-repeater employs only input and output optical fibers. To the contrary, a principal signal system in the optical amplifying repeater includes an optical circuit composed of some optical parts, so that a plurality of optical fibers for connecting these optical parts are necessary. These optical fibers are connected by splicing, for example, and the minimum bending radius of each optical fiber is defined. Accordingly, it is difficult to reduce the size of the repeater.

(2) In the optical amplifying repeater unlike the 3R-repeater, the optical circuit sometimes differs according to a short-distance transmission type or a long-distance transmission type.

(3) The interconnection interval between the optical amplifying repeaters is shorter than that between the 3R-repeaters. Accordingly, many optical amplifying repeaters must be put on a cable laying ship at a time.

(4) Since the interconnection interval is short, many optical amplifying repeaters must be manufactured.

(5) Since the interconnection interval is short, the repeaters are laid on a shallow sea floor in many cases. As a result, the temperature surrounding the repeaters is high, so that good heat radiation is required for the repeaters.

SUMMARY OF THE INVENTION

It is therefore an object of the present invention to provide an optical repeater which is suitable for a reduction in size, has good heat radiation, and is suitable for flexible manufacturing.

In accordance with the present invention, there is provided an optical repeater comprising a first optical fiber introduced from an input optical fiber cable for transmitting signal light; a light amplifying medium operatively connected to the first optical fiber; a pumping light source for outputting pumping light; optical coupling means operatively connected to the light amplifying medium and the pumping light source, for introducing the pumping light into the light amplifying medium; a drive circuit for driving the pumping light source so that the signal light is amplified in the light amplifying medium; a power circuit operatively connected to a power cable, for supplying electric power to the drive circuit; a second optical fiber for sending the signal light amplified in the light amplifying medium to an output optical fiber cable; a common frame defining an inner space for accommodating the light amplifying medium, the pumping light source, and the optical coupling means, the common frame being formed at its outer periphery with a bobbin portion for winding at least one of the first optical fiber and the second optical fiber; and an individual frame detachably fixed to the common frame, for mounting the drive circuit and the power circuit.

Preferably, the common frame has a side plate having a groove for accommodating lead lines for electrical circuit connection, outside the bobbin portion.

In the present invention, the light amplifying medium, the pumping light source, and the optical coupling means to be generally used irrespective of the product kinds of the optical repeater are accommodated in the common frame. Accordingly, the common frame accommodating these optical elements can be used as a general-purpose common module. The drive circuit and the power circuit which are sometimes different according to the product kinds of the optical repeater are mounted on the individual frame. Therefore, the flexible manufacturing of the optical repeater can be facilitated. Further, the bobbin portion for winding the optical fibers is formed at the outer peripheral portion of the common frame. Accordingly, the bending radius of each optical fiber can be easily made fall within an allowable range. Further, the pumping light source (e.g., laser diode) as one of heating elements is accommodated inside the common frame, and the individual frame on which the drive circuit and the power circuit as the other heating elements is fixed to the common frame. Accordingly, the locations of all the heating elements can be distributed to thereby improve heat radiation.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
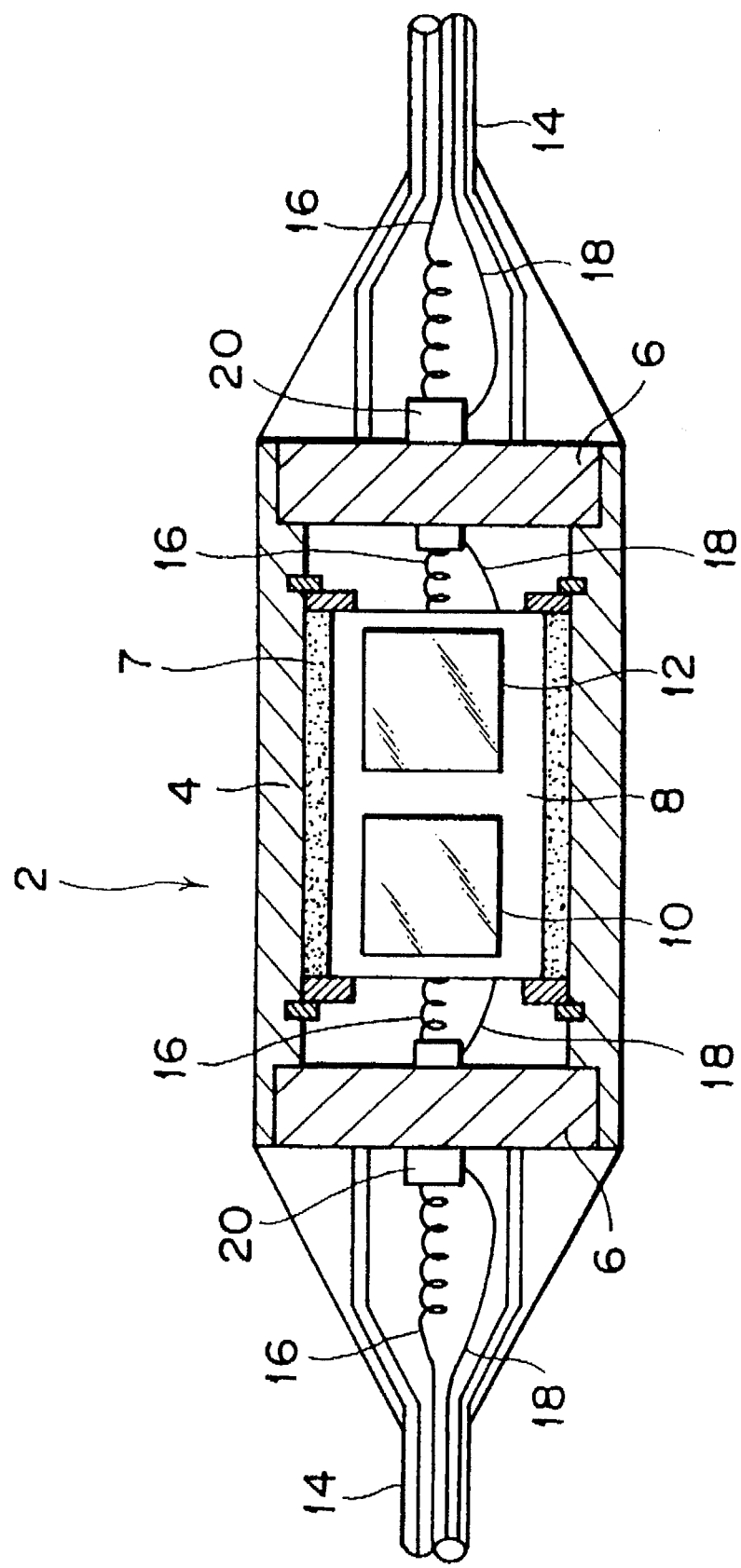
FIG. 1 is a vertical sectional view of an optical repeater to which the present invention is applicable.

FIG. 1 is a vertical sectional view of an optical repeater to which the present invention is applicable. The optical repeater shown in FIG. 1 has a pressure-resistance housing 2. The housing 2 consists of a cylindrical member 4 and a pair of end plates 6 closing the opposite ends of the cylindrical member 4. An internal structure 8 is enclosed in the housing 2 through a radiating/shock absorbing member 7. The internal structure 8 has two inner units 10 and 12 in this preferred embodiment. Submarine optical cables 14 are connected to the opposite ends of the housing 2. Each submarine optical cable 14 has a power cable 16 for feeding a series constant current and an optical fiber cable 18. The power cable 16 and the optical fiber cable 18 of each submarine optical cable 14 are introduced into the housing 2 through a bushing 20 inserted through a substantially central portion of each end plate 6, and are connected electrically and optically to the internal structure 8.

Figure 2:
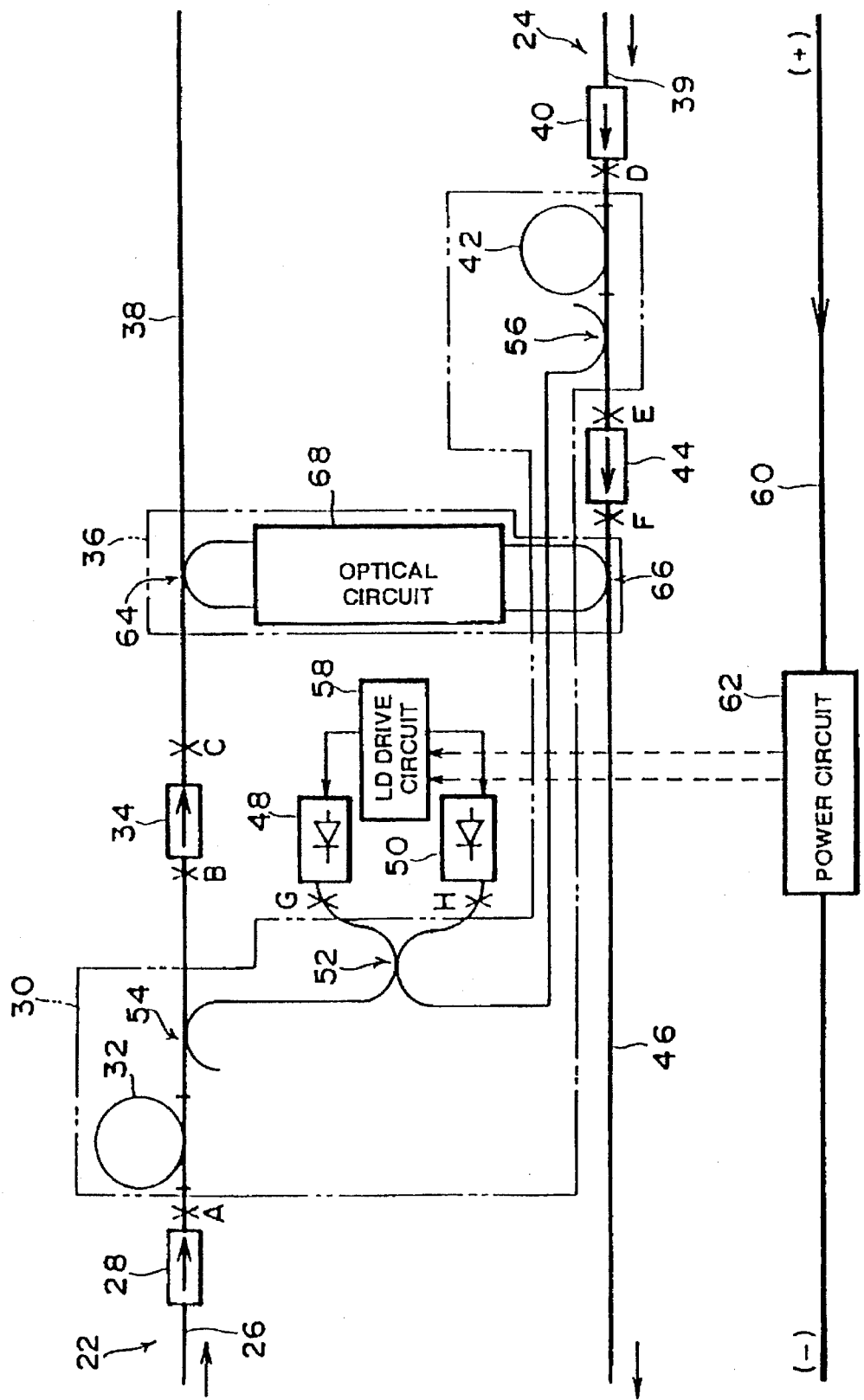
FIG. 2 is a block diagram of an inner unit to which the present invention is applicable.

FIG. 2 is a block diagram of the inner unit (the inner unit 10 or 12) shown in FIG. 1. The inner unit has an up channel 22 and a down channel 24. Signal light supplied from an input optical fiber cable of the up channel 22 propagates from the left to the right as viewed in FIG. 2, whereas signal light supplied from an input optical fiber cable of the down channel 24 propagates from the right to the left as viewed in FIG. 2. Reference numeral 26 denotes an optical fiber introduced from the input optical fiber cable of the up channel 22. The signal light supplied from the optical fiber 26 is input through an optical isolator 28 into a doped fiber module 30. The signal light amplified in a doped fiber 32 included in the doped fiber module 30 is transmitted through an optical isolator 34 and an output optical circuit module 36 to an optical fiber 38. The optical fiber 38 is introduced from an output optical fiber cable of the up channel 22.

Reference numeral 39 denotes an optical fiber introduced from an input optical fiber cable of the down channel 24. Signal light supplied from the optical fiber 39 is input through an optical isolator 40 into another doped fiber 42 included in the doped fiber module 30. The signal light amplified in the doped fiber 42 is transmitted through an optical isolator 44 and the output optical circuit module 36 to an optical fiber 46. The optical fiber 46 is introduced from an output optical fiber cable of the down channel 24.

Two laser diodes 48 and 50 are used to pump the doped fibers 32 and 42. The doped fiber module 30 further includes a 3-dB optical coupler 52 for combining output lights from the laser diodes 48 and 50 and generating two equally divided pumping lights, and wavelength division multiplexer couplers 54 and 56 for supplying the two equally divided pumping lights to the doped fibers 32 and 42, respectively. The laser diodes 48 and 50 are supplied with controlled DC currents from an LD drive circuit 58.

A power circuit 62 is provided at a midpoint in a power cable 60. The power circuit 62 supplies electric power to the LD drive circuit 58. The output optical circuit module 36 includes an optical coupler 64 provided on the downstream side of the optical isolator 34 in the up channel 22, an optical coupler 66 provided on the downstream side of the optical isolator 44 in the down channel 24, and an optical circuit 68 connected to the optical couplers 64 and 66. The optical circuit 68 is provided to perform exchange or the like of a part of signal light between the up channel 22 and the down channel 24.

The doped fibers 32 and 42 as a light amplifying medium are manufactured by doping at least a core of an optical fiber with a rare earth element such as Er. In the case that the wavelength of signal light to be amplified falls in a 1.55 μm band, Er, for example, is selected as a dopant, and the wavelength of the pumping light is set to 0.98 μm or 1.49 μm, for example.

In the up channel 22, the pumping light from the 3-dB optical coupler 52 is supplied through the wavelength division multiplexer coupler 54 to the doped fiber 32, thereby pumping the dopant in the doped fiber 32. When signal light is supplied to the doped fiber 32 in this pumped condition, the signal light is amplified and input through the wavelength division multiplexer coupler 54 into the optical isolator 34. In the down channel 24, the pumping light from the 3-dB optical coupler 52 is supplied through the wavelength division multiplexer coupler 56 into the doped fiber 42. Signal light amplified in the doped fiber 42 is input through the wavelength division optical coupler 56 into the optical isolator 44.

In this preferred embodiment, all optical parts are of a pigtail type, and the connection of the pigtails is effected by splicing. Splicing points are denoted by reference characters A to H in FIG. 2. In the up channel 22, the reference character A denotes the splicing point between the optical isolator 28 and the doped fiber module 30; the reference character B denotes the splicing point between the module 30 and the optical isolator 34, and the reference character C denotes the splicing point between the optical isolator 34 and the output optical circuit module 36. In the down channel 24, the reference character D denotes the splicing point between the optical isolator 40 and the doped fiber module 30; the reference character E denotes the splicing point between the module 30 and the optical isolator 44; and the reference character F denotes the splicing point between the optical isolator 44 and the output optical circuit module 36. The reference character G denotes the splicing point between the laser diode 48 and one of the two input ports of the 3-dB optical coupler 52, and the reference character H denotes the splicing point between the laser diode 50 and the other input port of the 3-dB optical coupler 52.

In the case that a series constant current is fed, a feed voltage in long-distance transmission becomes remarkably high, and a power circuit provided with a surge protective circuit is sometimes required. For example, in an optical repeater having a plurality of inner units as shown in FIG. 1, a power circuit for one of the inner units is required to have a surge protective circuit, but power circuits for the other inner units are not required to have surge protective circuits.

In FIG. 2, the optical isolators 28 and 40 provided on the input side are necessary in short-distance transmission, but they are unnecessary in long-distance transmission. Accordingly, by configuring a common module excluding the power circuit 62 and the optical isolators 28 and 40 shown in FIG. 2, it is possible to obtain the structure of an optical repeater suitable for flexible manufacturing. This configuration will now be described more specifically.

Figure 3:
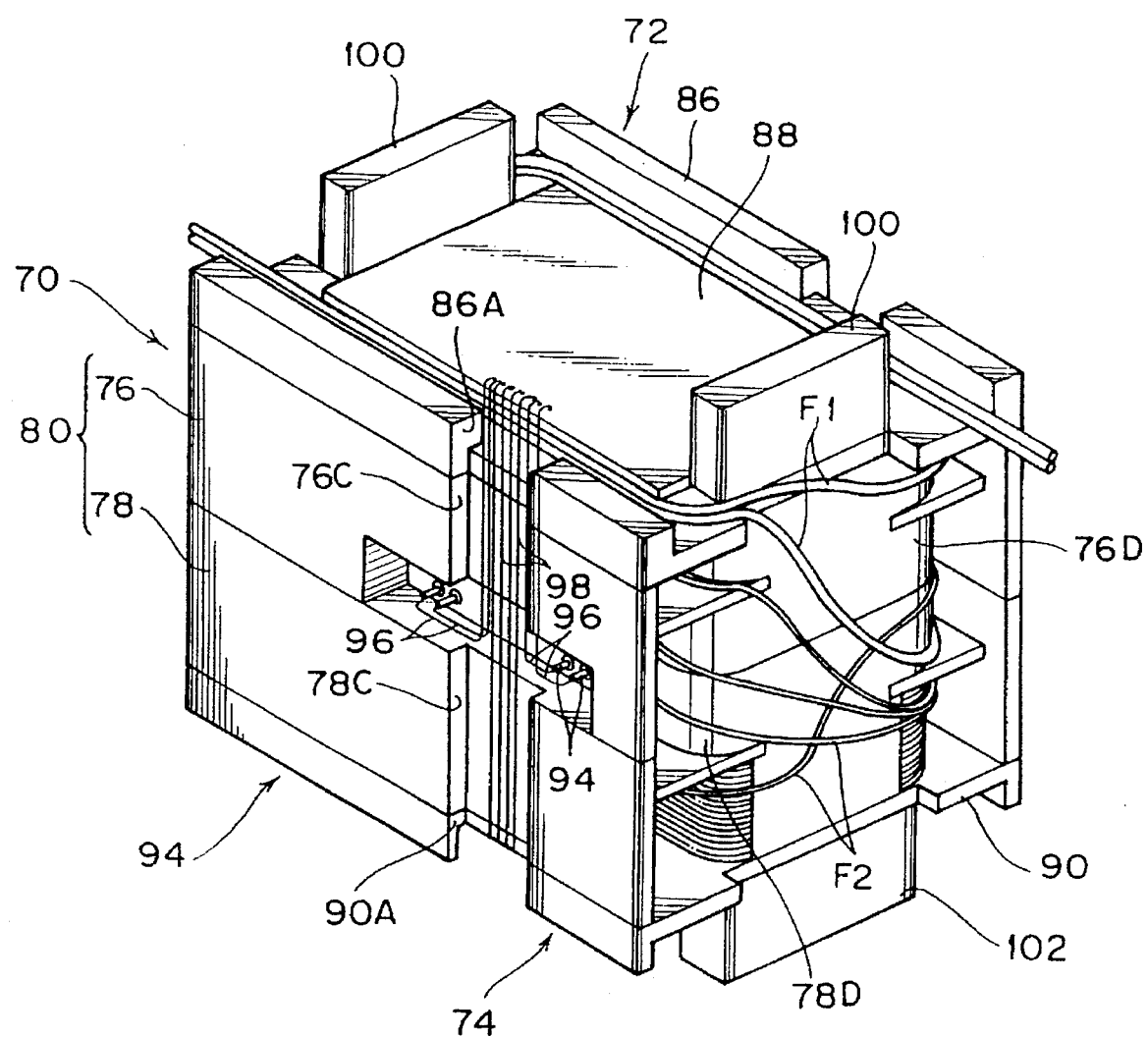
FIG. 3 is a perspective view of the inner unit.
Figure 4:
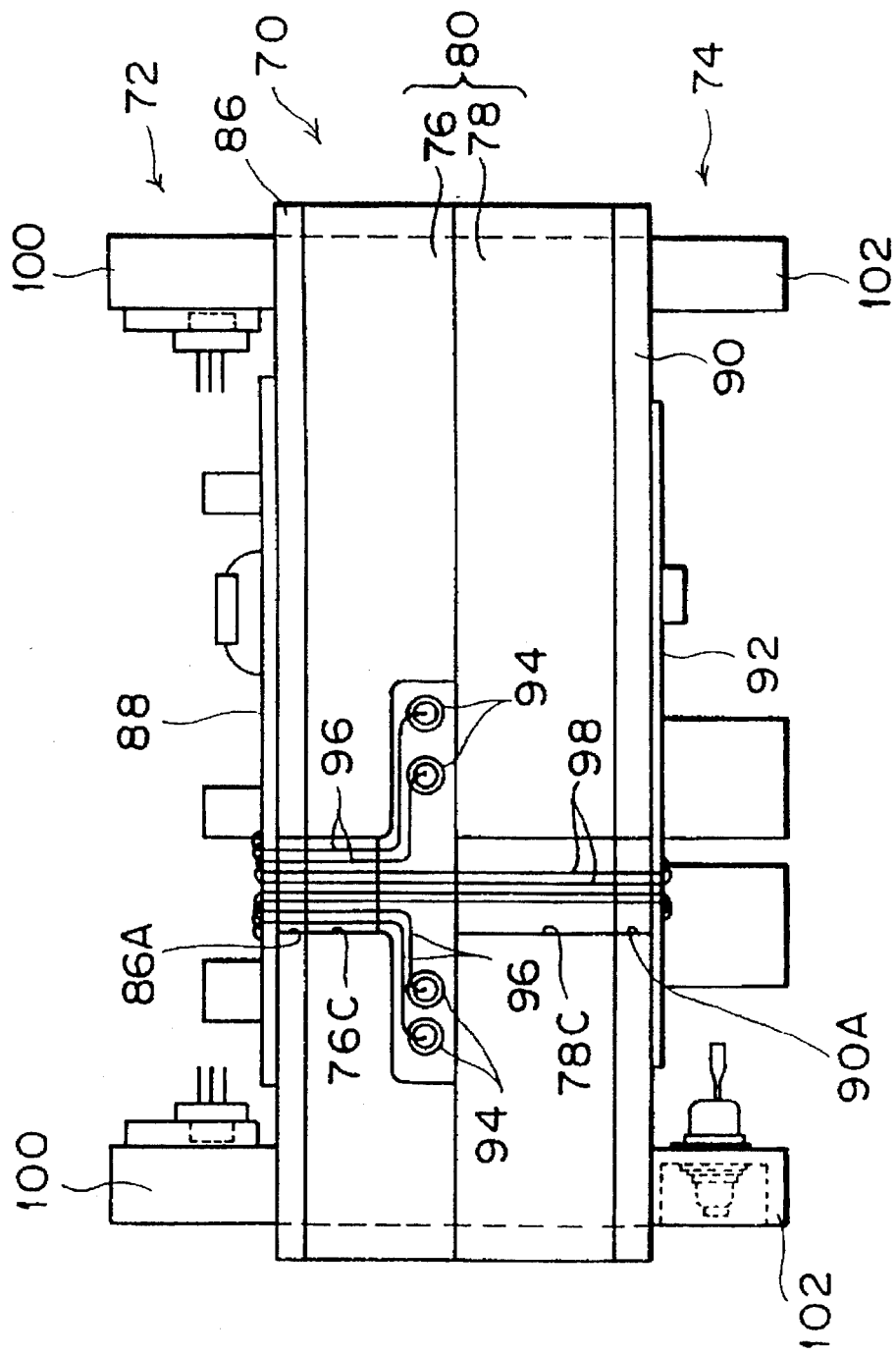
FIG. 4 is a side view of the inner unit shown in FIG. 3.
Figure 5:
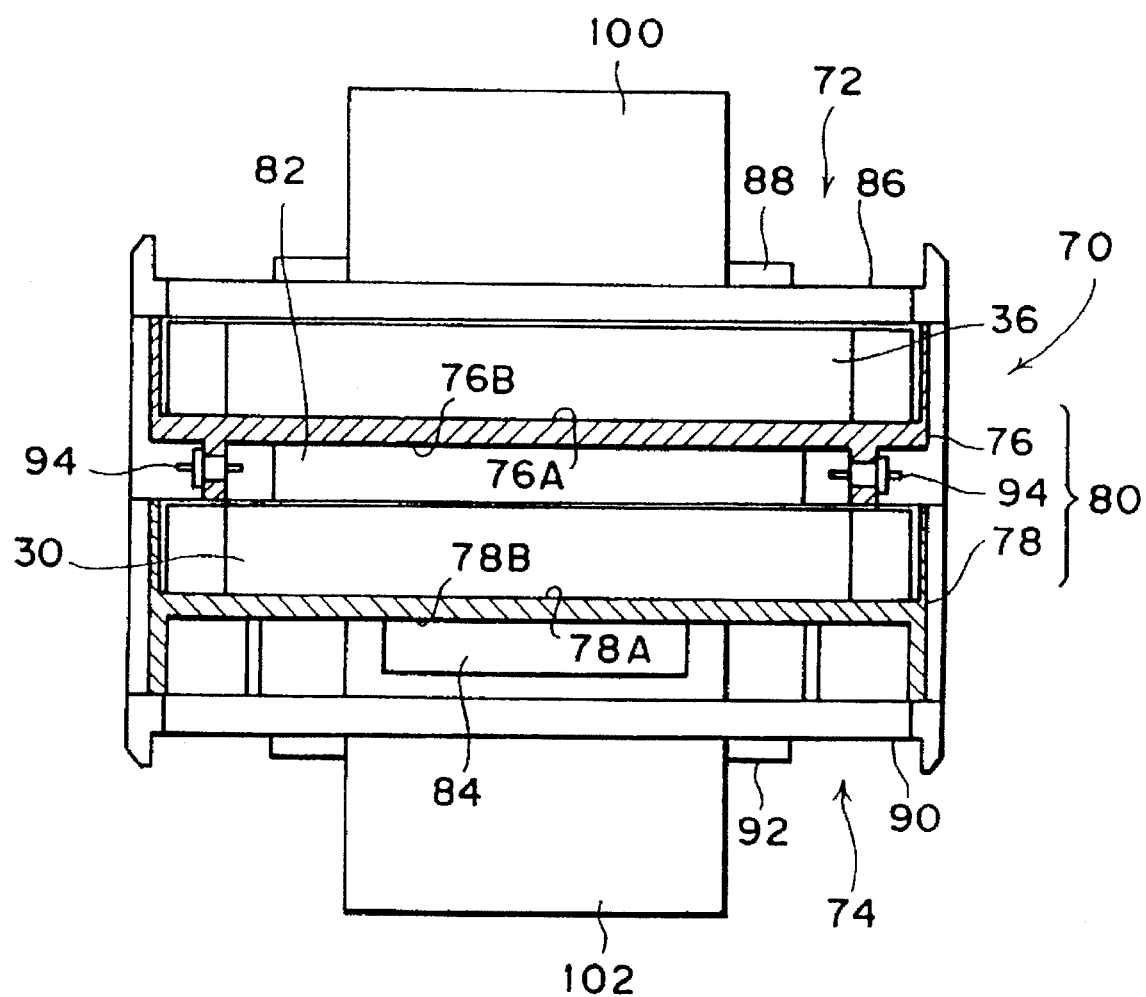
FIG. 5 is a partially sectional, end view of the inner unit shown in FIG. 3.

FIGS. 3, 4, and 5 are a perspective view, a side view, and a partially sectional, end view of an inner unit to which the present invention is applied. This inner unit is designed as one excluding the optical isolators 28 and 40 shown in FIG. 2 for long-distance transmission and also excluding a surge protective circuit in the power circuit 62. This inner unit includes a common module 70, a drive circuit module 72 provided on the upper side of the common module 70, and a power supply module 74 provided on the lower side of the common module 70. The common module 70 has a common frame 80 consisting of an upper common frame 76 and a lower common frame 78 integrated together.

As best shown in FIG. 5, the output optical circuit module 36 is mounted on an upper surface 76A of the upper common frame 76, and an LD module 82 is mounted on a lower surface 76B of the upper common frame 76. The LD module 82 includes the laser diodes 48 and 50 for outputting the pumping light (see FIG. 2). The doped fiber module 30 is mounted on an upper surface 78A of the lower common frame 78, and an optical isolator module 84 is mounted on a lower surface 78B of the lower common frame 78. The optical isolator module 84 includes the optical isolators 34 and 44 (see FIG. 2). The upper common frame 76 and the lower common frame 78 are integrated together in such a manner that the lower surface 76B and the upper surface 78A are opposed to each other, thereby defining an inner space between the lower surface 76B and the upper surface 78A. Accordingly, the LD module 82 and the doped fiber module 30 are accommodated in this inner space.

The drive circuit module 72 has an upper individual frame 86 detachably fixed to the upper side of the common frame 80 so as to be opposed to the upper surface 76A of the upper common frame 76, and has a printed wiring board 88 mounted on the upper individual frame 86 to function as the LD drive circuit 58 (see FIG. 2). The power supply module 74 has a lower individual frame 90 detachably fixed to the lower side of the common frame 80 so as to be opposed to the lower surface 78B of the lower common frame 78, and has a printed wiring board 92 mounted on the lower individual frame 90 to function as the power circuit 62 (see FIG. 2). In this case, the printed wiring board 92 functions also as a surge protective circuit.

The upper common frame 76 has opposite side plates, which are provided with a plurality of through terminals 94 connected to the LD module 82. The through terminals 94 are connected to the drive circuit module 72 by a plurality of lead lines 96. With this arrangement, the drive circuit module 72 can be electrically connected to the laser diodes 48 and 50 as a pumping light source (see FIG. 2). The drive circuit module 72 and the power supply module 74 are electrically connected by a plurality of lead lines 98. In this preferred embodiment, each side plate of the common frame 80 (the upper common frame 76 and the lower common frame 78) is formed with vertically extending grooves 76C and 78C, so as to accommodate electrical wiring including the lead lines 96 and 98. Further, each side edge of the upper individual frame 86 and the lower individual frame 90 is formed with recesses 86A and 90A aligned with the grooves 76C and 78C, respectively.

Figure 6:
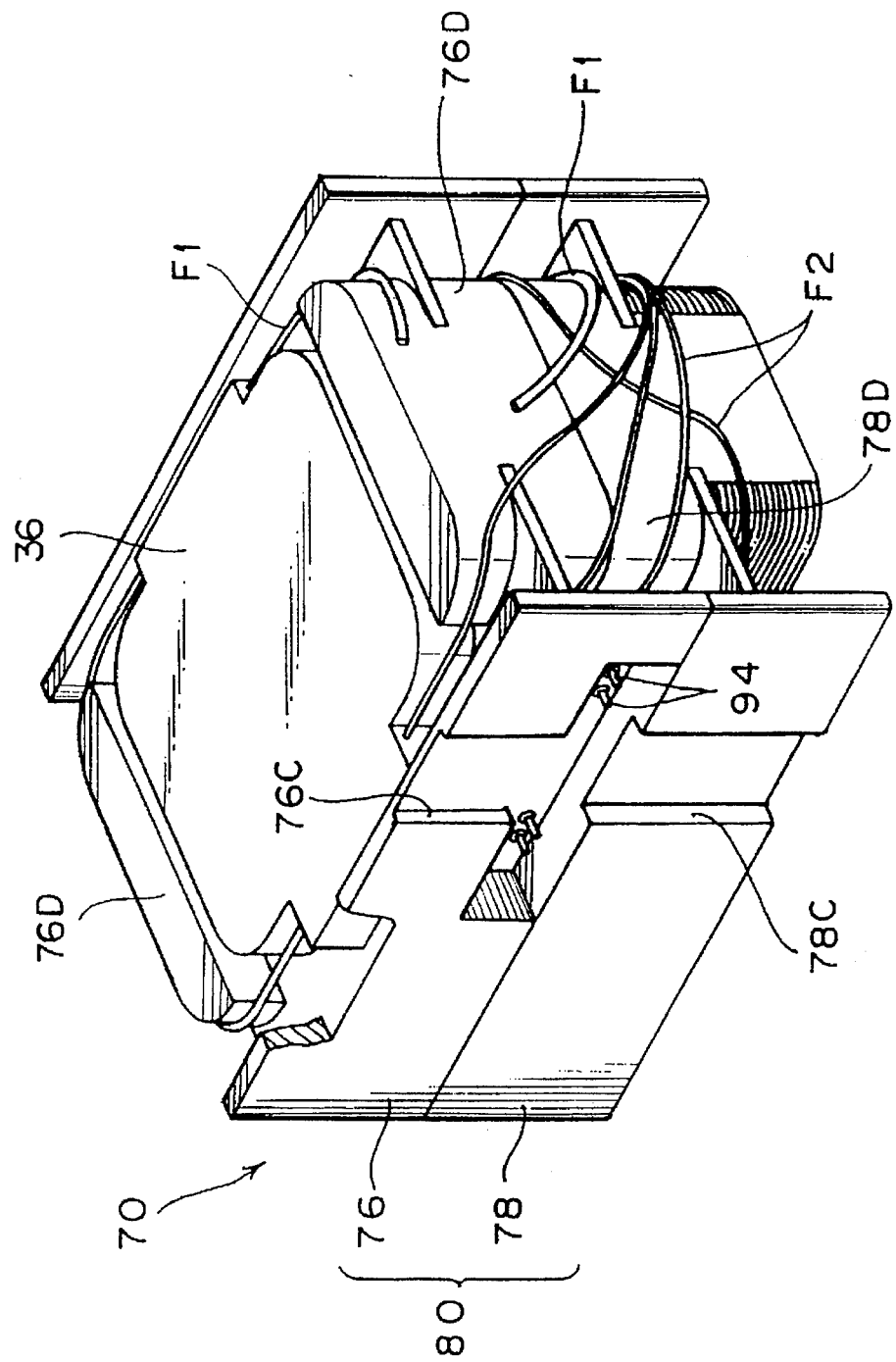
FIG. 6 is a perspective view of a common module according to a preferred embodiment of the present invention.

FIG. 6 is a perspective view of the common module 70. The common frame 80 (the upper common frame 76 and the lower common frame 78) has two bobbin portions 76D and two bobbin portions 78D, respectively, for winding optical fibers for optical wiring inside the opposite side plates having the grooves 76C and 78C. Optical fibers F1 shown by relatively thick lines in FIG. 6 correspond to the optical fibers 26, 38, 39, and 46 introduced from the input and output optical fiber cables, and optical fibers F2 shown by relatively thin lines in FIG. 6 correspond to the optical fibers for optical connection including the splicing points A to H.

The minimum radius of curvature of the bobbin portions 76D and 78D is set larger than the allowable bending radius of each optical fiber. The two bobbin portions 76D are formed at the opposite outer peripheral portions of the upper common frame 76 on which the output optical circuit module 36 and the LD module 82 are mounted, and the two bobbin portions 78D are formed at the opposite outer peripheral portions of the lower common frame 78 on which the doped fiber module 30 and the optical isolator module 84 are mounted. Accordingly, the optical fibers can be easily accommodated in the inner unit without enlarging the outer shape of the inner unit and bending the optical fibers to a radius smaller than the allowable bending radius. As a result, the inner unit can be reduced in size. Further, the provision of such bobbin portions allows easy optical wiring including the splicing.

Figure 7A:
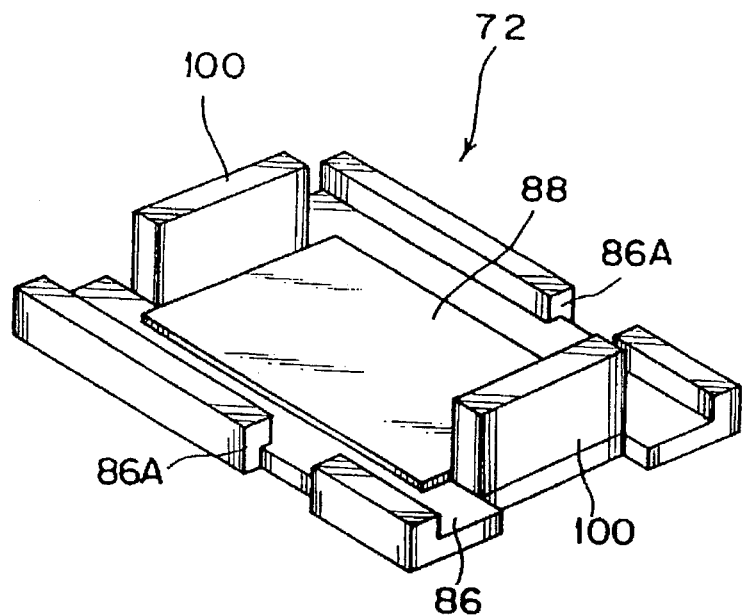
FIGS. 7A and 7B are perspective views of different types of drive circuit modules to which the present invention is applicable.
Figure 7B:
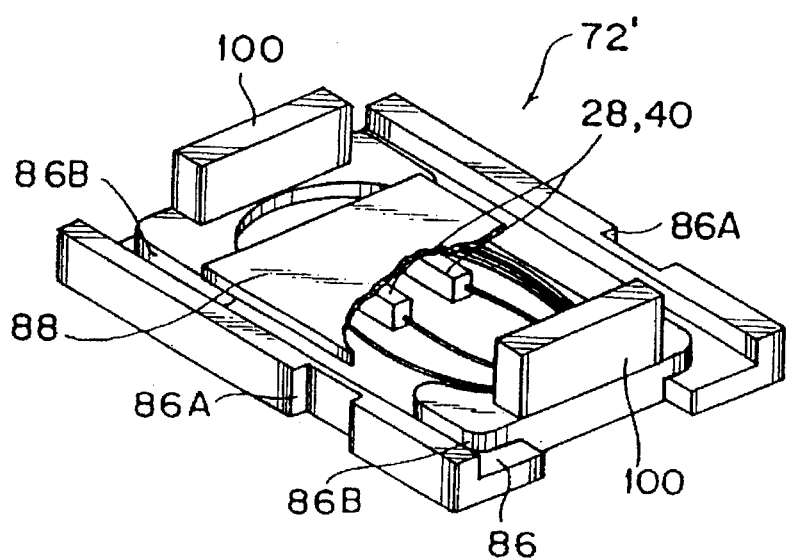

FIGS. 7A and 7B are perspective views of two kinds of drive circuit modules. The drive circuit module 72 shown in FIG. 7A is the same as that shown in FIGS. 3 to 5. The printed wiring board 88 functioning as the LD drive circuit 58 (see FIG. 2) is mounted on the upper individual frame 86. That is, the drive circuit module 72 has no optical parts. Reference numeral 100 denotes a radiating portion on which heating parts such as a power transistor are to be mounted. The radiating portion 100 is formed integrally with the upper individual frame 86.

In contrast, a drive circuit module 72' shown in FIG. 7B has the optical isolators 28 and 40 on the input side as illustrated in FIG. 2 between the upper individual frame 86 and the printed wiring board 88. The upper individual frame 86 has two bobbin portions 86B corresponding in shape to the two bobbin portions 76D of the upper common frame 76, so as to facilitate the optical connection of the optical isolators 28 and 40 to the optical fibers.

Thus, the compatible drive circuit modules are prepared to thereby facilitate the flexible manufacturing of the inner unit. For example, by using the drive circuit module 72 having no optical isolators as shown in FIG. 7A, it is possible to provide an inner unit for an optical repeater applicable to long-distance transmission, whereas by using the drive circuit module 72' having optical isolators as shown in FIG. 7B, it is possible to provide an inner unit for an optical repeater applicable to short-distance transmission.

Figure 8A:
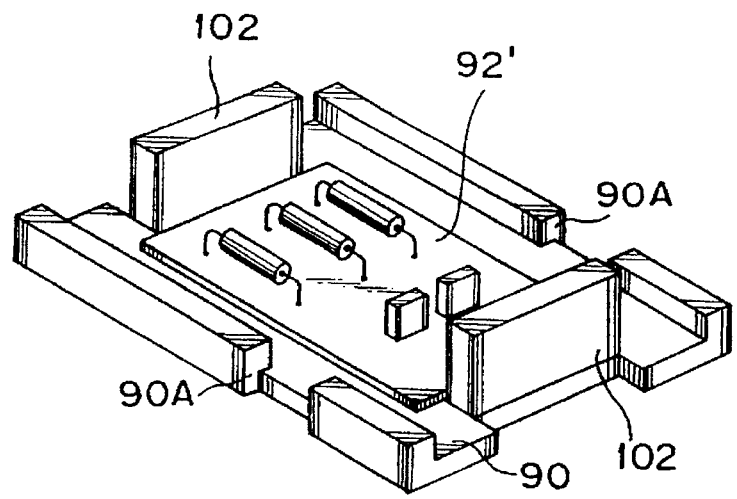
FIGS. 8A and 8B are perspective views of different types of power supply modules to which the present invention is applicable.
Figure 8B:
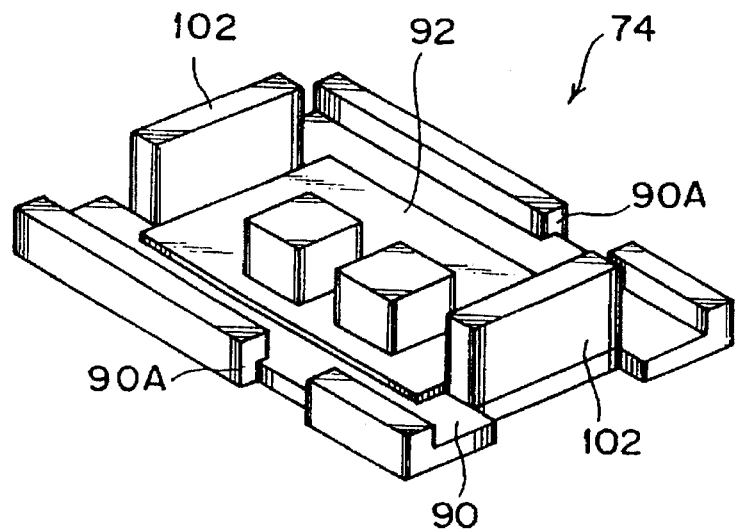

FIGS. 8A and 8B are perspective views of two kinds of power supply modules. The power supply module shown in FIG. 8A has a printed wiring board 92' having no surge protective circuit, and the power supply module shown in FIG. 8B has a printed wiring board 92 having a surge protective circuit.

For example, in using an optical repeater having two inner units as shown in FIG. 1, the power supply module provided in one of the two inner units is of the type shown in FIG. 8A, and the power supply module provided in the other inner unit is of the type shown in FIG. 8B. In using an optical repeater having three or more inner units, the power supply module provided in one of the three or more inner units is of the type shown in FIG. 8B, and the power supply modules provided in the other inner units are of the type shown in FIG. 8A. Reference numeral 102 denotes a radiating portion formed integrally with the lower individual frame 90. Heating parts are mounted on the radiating portion 102. Thus, the compatible power supply modules are prepared to thereby facilitate the flexible manufacturing of the inner unit for the optical repeater.

Figure 9:
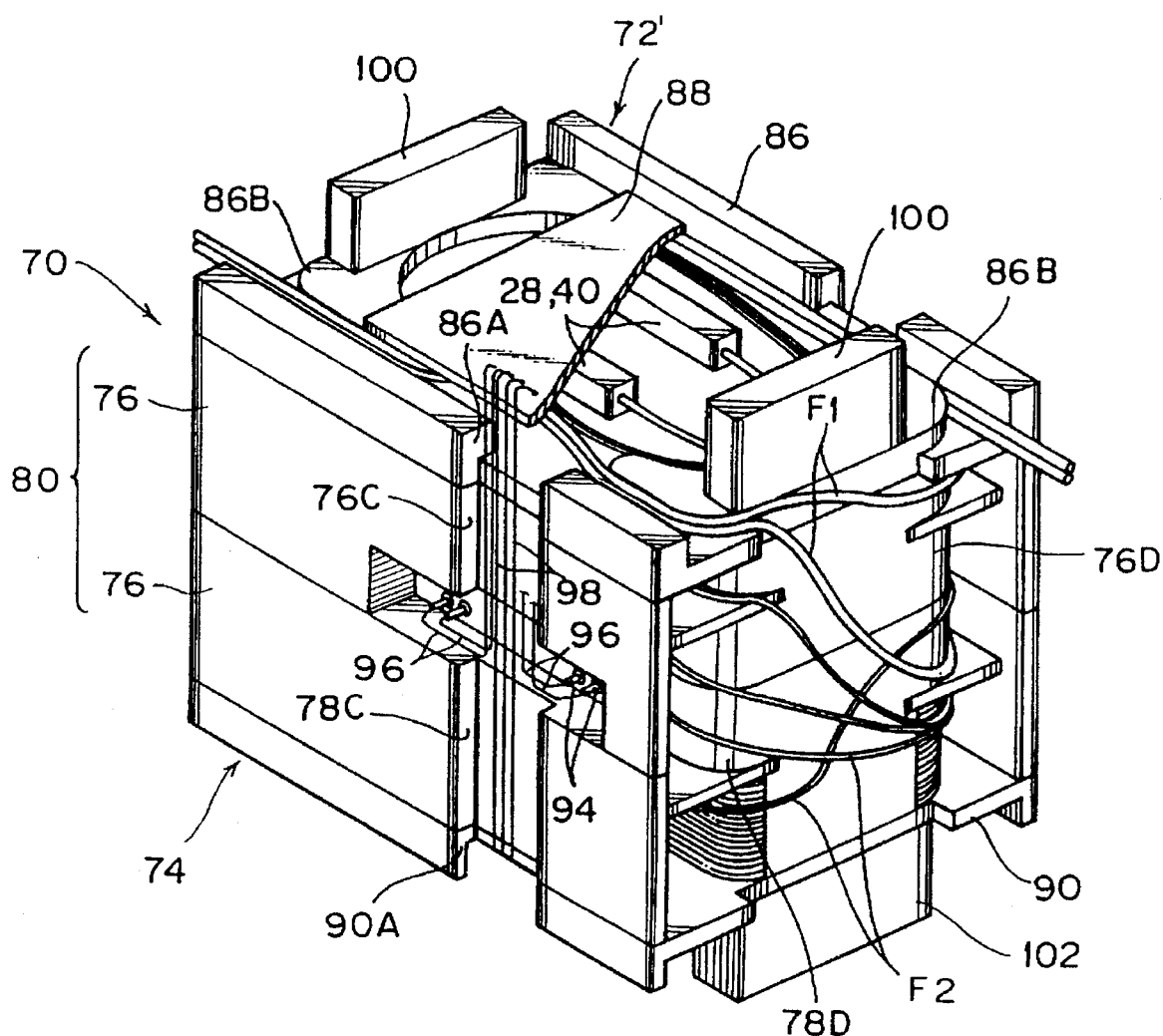
FIG. 9 is a partially cutaway, perspective view of an inner unit according to another preferred embodiment of the present invention.

FIG. 9 is a partially cutaway, perspective view of another inner unit to which the present invention is applicable. The inner unit shown in FIG. 3 has the drive circuit module 72 shown in FIG. 7A. In contrast, the inner unit shown in FIG. 9 is characterized in that it has the drive circuit module 72' shown in FIG. 7B in place of the drive circuit module 72. The drive circuit module 72' has the optical isolators 28 and 40 optically connected to the input optical fiber cables as shown in FIG. 2. Accordingly, this inner unit is suitable for an optical repeater for short-distance transmission.

As apparent from the various preferred embodiments described above, the inner unit for the optical repeater is divided into the common module and the compatible individual modules for every function. Accordingly, the flexible manufacturing of the inner unit can be easily carried out by limited production facilities. Further, the bobbin portions for winding the optical fibers are formed at the outer peripheral portions of the common frame. Accordingly, a limited space can be effectively utilized to thereby facilitate a reduction in size of the inner unit. Further, the LD module for outputting the pumping light as a heating element is accommodated inside the common frame, and the drive circuit module and the power supply module as other heating elements are fixed to the upper and lower sides of the common frame, respectively. Accordingly, the locations of the plural heating elements can be distributed to thereby ensure good heat radiation of the inner unit. Thus, it is possible to provide an optical repeater which is suitable for a reduction in size, has good heat radiation, and is suitable for flexible manufacturing according to the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical repeater comprising:

a first optical fiber introduced from an input optical fiber cable for transmitting signal light;

a light amplifying medium operatively connected to said first optical fiber;

a pumping light source for outputting pumping light;

optical coupling means operatively connected to said light amplifying medium and said pumping light source, for introducing said pumping light into said light amplifying medium;

a drive circuit for driving said pumping light source so that said signal light is amplified in said light amplifying medium;

a power circuit operatively connected to a power cable, for supplying electric power to said drive circuit;

a second optical fiber for sending said signal light amplified in said light amplifying medium to an output optical fiber cable;

a common frame defining an inner space wherein for accommodating said light amplifying medium, said pumping light source, and said optical coupling means, said common frame having at an outer periphery thereof a bobbin portion for winding at least one of said first optical fiber and said second optical fiber; and an individual frame detachably fixed to said common frame, for mounting said drive circuit and said power circuit.

2. An optical repeater according to claim 1, further comprising a first lead line for connecting said pumping light source and said drive circuit, and a second lead line for connecting said drive circuit and said power circuit;

said common frame having a side plate provided outside said bobbin portion, said side plate having a groove for accommodating said first and second lead lines.

3. An optical repeater according to claim 1, wherein said common frame comprises an upper common frame having a first surface and a second surface, and a lower common frame having a third surface and a fourth surface;

said upper common frame and said lower common frame are integrated together so that said second surface and said third surface are opposed to each other to thereby define said inner space between said second surface and said third surface;

said individual frame comprises an upper individual frame opposed to said first surface and a lower individual frame opposed to said fourth surface; and said drive circuit and said power circuit are mounted on said upper individual frame and said lower individual frame, respectively.

4. An optical repeater according to claim 3, further comprising a first optical isolator provided at a midpoint in said second optical fiber, said first optical isolator being mounted on said fourth surface.

5. An optical repeater according to claim 4, further comprising a second optical isolator provided at a midpoint in said first optical fiber, said second optical isolator being mounted on said upper individual frame.

6. An optical repeater according to claim 3, further comprising a surge protective circuit mounted on said lower individual frame.

7. An optical repeater according to claim 1, wherein said light amplifying medium comprises a rare earth element doped fiber.

8. An optical repeater according to claim 1, wherein a set of said first optical fiber, said light amplifying medium, and said second optical fiber is provided for each of an up channel and a down channel;

said pumping light source comprises a first laser diode and a second laser diode; and said optical coupling means comprises a 3-dB optical coupler having first to fourth ports, said first and second ports being connected to said first and second laser diodes, respectively, said third and fourth ports being operatively connected to said light amplifying medium for said up channel and said light amplifying medium for said down channel, respectively.

* * * * *